Sept. 22, 1970 R. SCHIAROLI 3,529,353
ORTHODONTIC DEVICE
Filed Nov. 19, 1968

INVENTOR.
Roberto Schiaroli
BY
Sparrow and Sparrow
ATTORNEYS

United States Patent Office 3,529,353
Patented Sept. 22, 1970

3,529,353
ORTHODONTIC DEVICE
Roberto Schiaroli, Piazza Palermo 9/5, Genoa, Italy
Filed Nov. 19, 1968, Ser. No. 776,889
Claims priority, application Italy, Nov. 23, 1967,
7,448A/67
Int. Cl. A61c 7/00
U.S. Cl. 32—14          5 Claims

ABSTRACT OF THE DISCLOSURE

Orthodontic screw for correction of one or more incisor diastems and other minor dental abnormalities, substantially comprising a rod having a right-hand threaded portion and left-hand threaded opposite portion, each portion having threaded thereon a small slider carrying a radially extending pair of steel wires, said rod and sliders being received (rotatably the former and axially slidably the latter) in a tubular housing having on one side a longitudinal slot through which said pairs of wires project radially; the latter will be suitably shaped to effect an anchorage on the teeth whose position is to be corrected. The assembly is, as usual, embedded in an orthodontic plate and is adjustable by suitable actuation of said rod.

BACKGROUND OF THE INVENTION

This invention relates to an auxiliary orthodontic means that, with respect to the presently used similar appliances, is distinguished by its compact and simple construction, and by other features which enable in a more simple and reliable way all orthodontic movements of diastemized teeth, including those requiring hitherto complicated and difficult operations with results that—despite of all valuable efforts—were not entirely satisfactory.

The article according to the invention, after the pressure wires thereof have been suitably shaped on the teeth to be moved (which operation can be effected easily), can be used very effectively for treatment of various abnormalities; in fact, the versatility of this appliance is one of the main advantages thereof, as will become apparent from the following disclosure.

SUMMARY OF THE INVENTION

The article of the invention substantially comprises a rod having a right-hand threaded portion and a left-hand threaded opposite portion, each portion having threaded thereon a small slider whereon is welded a radially extending pair of suitable steel wires, said rod and sliders being received (rotatably the former and axially slidably the latter) in a tubular housing which is closed at both ends and the internal length of which is the same as the length of said rod, and having on one side (preferably along the entire length thereof) a longitudinal slot through which said two pairs of steel wires project radially. The connecting end or base of each pair of wires engages at both sides the two longitudinal edges of said slot and, therefore, acts as a key so that the sliders are prevented to rotate with the rod; the latter is provided, at the center of a cylindrical not threaded portion, with diametric blind or through holes into which—via a suitable cutout in said housing—a pointed tool can be inserted for rotating the rod and causing micrometric oppositely-directed displacements of the sliders and respective s'eel wires which—after suitable shaping—are anchored on the teeth to be subjected to orthodontic movement.

The basic embodiment of the orthodontic screw according to the invention is particularly adapted for proper and simultaneous treatment of one or more incisor diastems. In fact, by suitably shaping the steel wires that are welded to the sliders on the rod, and by merely rotating said rod, it will be easy to move four incisors (for example two lateral and two central incisors) and make them converge towards the center of mouth.

To effect partial movements, the invention provides a simplified embodiment of the screw, that is one comprising a rod with one single thread and one single slider, all the other structural features remaining unchanged. This modified type is able to reduce any abnormality arising from early loss of deciduous teeth, and its action aids the eruption of a partially retained tooth. This screw, inter alia, can be used for any movement, either from the right and from the left side, and either onward or backward, and for an upper or a lower movement. The screw is also particularly adapted for all cases wherein orthodontic treatment requires tooth extraction.

In the prosthesis field, the double reduction screw can be used for application of prosthesis when parallelism of supporting teeth is missing due to previous extractions, in that it restores the required parallelism and avoids any loss of dental tissues on supporting teeth.

BRIEF DESCRIPTION OF THE DRAWING

The accompanying drawing shows a preferred and basic embodiment of the invention, as well as some modifications, with respective examples of application; in the drawing.

DESCRIPTION OF THE PREFERRED EMBODIMENT

Figure 1:
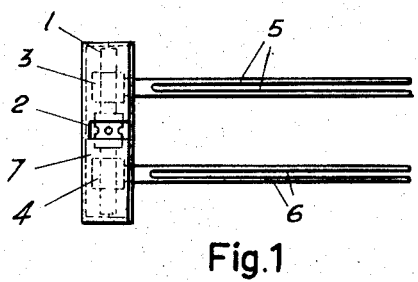
FIG. 1 is an enlarged plan view of a basic embodiment of the orthodontic screw according to the invention.
Figure 2:
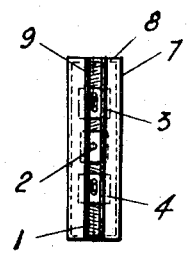
FIG. 2 is a side view of FIG. 1.
Figure 3:
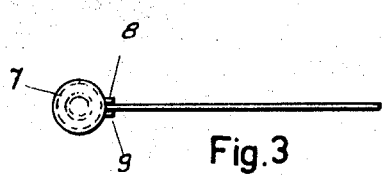
FIG. 3 is a front view of FIG. 1.
Figure 4:
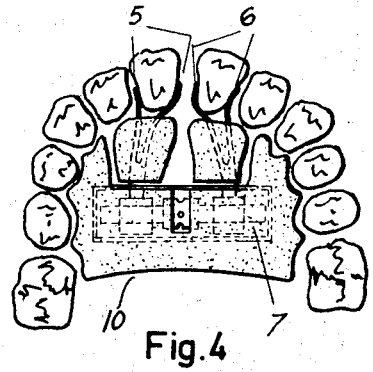
FIG. 4 is a diagrammatic plan view of a complete appliance according to the invention, properly applied for reduction (correction) of a central incisor diastem.
Figure 5:
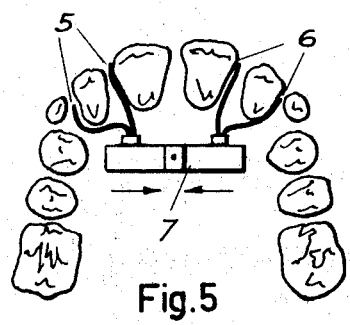
FIG. 5 is a diagrammatic plan view of a screw according to the invention, properly applied for normal and simultaneous correction of three inter-incisor diastems.
Figure 6:
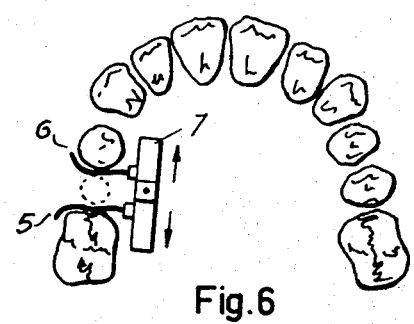
FIG. 6 is a diagrammatic plan view of a screw according to the invention, applied for mutually spacing the 4th and 6th teeth in order to create the space for normal eruption of the retained 5th tooth.
Figure 7:
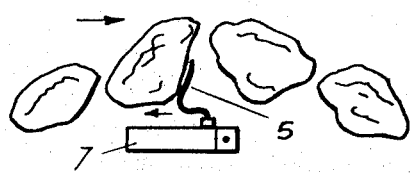
FIG. 7 is another diagrammatic plan view of an appliance according to the invention, with a single-thread rod, properly applied to correct the rotation of a left central incisor by means of a translational movement of the slider.
Figure 8:
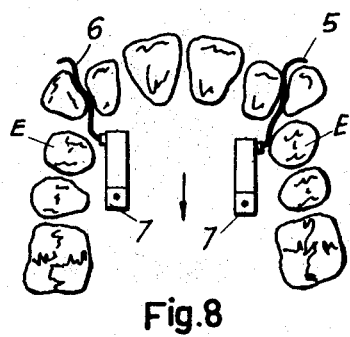
FIG. 8 is a diagrammatic plan view of two single screws as in FIG. 7, applied for orthodontic treatment, after extraction of two first premolars, of two canines to be retracted.

As clearly shown on FIGS. 1 to 3, the orthodontic screw according to the invention comprises a rod 1 threaded on both sides, that is with right-hand threads on one side portion and left-hand threads on the opposite side portion. The rod 1 has a central cylindrical smooth portion 2 of a slightly larger diameter than the threaded portions, and provided with small diametric holes, either blind or through holes, wherein the point of a pin-shaped tool can be inserted to actuate the rod 1.

Each of the threaded portions of rod 1 has threaded thereon a slider 3 and 4, respectively, each having a radially projecting pair of parallel steel wires 5, 6 adapted to be bent upon application of the appliance so as to conform to the associated teeth, as shown on FIGS. 4 to 8.

The rod 1, with associated sliders 3 and 4, is rotatably mounted in a tubular housing 7, preferably made of stainless steel sheet or other material having similar characteristics. The housing 7 is closed at both ends and has such an internal length as to accurately accommodate, preferably with no axial clearance, the rod 1 with the sliders thereon. The housing 7 has a longitudinal slot having the same length as the housing and through which the base of each pair of steel wires 5, 6—that is connected to the respective slider 3, 4—projects radially. The parallel edges of said slot are suitably strengthened and are so spaced as to properly guide the sliders 3 and 4 through said connecting bases of the pairs of steel wires 5 and 6, whereby—upon rotation of rod 1—the sliders, which are prevented to rotate, will move longitudinally along said slot in either direction while the pairs of steel wires are maintained accurately in line on the same plane.

In order to permit actuation of the orthodontic screw, that is to engage a suitable pointed tool on the central portion of rod 1, the housing 7 is provided with a suitable cutout opposite said central portion, or, preferably, opposite said diametric holes.

Moreover, according to the invention, the housing 7 is provided with at least one anchoring outward projection or other suitable means, for example a tapered and slightly curved tongue, for anchoring the orthodontic screw in the supporting base plate 10 (FIG. 4), that usually is made to the individual particular requirements, and preferably of plastics.

In order to effect simple unilateral tooth movements, the orthodontic screw according to the invention, as already stated, can also be constructed in a simplified embodiment comprising a rod 1 threaded only on one side and provided with one single slider (FIGS. 7 and 8) and respective pair of pressure wires. As shown on FIGS. 6, 7 and 8, this pair of wires can be replaced by one single wire. This simplified embodiment is particularly adapted for the cases where orthodontics requires tooth extraction, such as the case of FIG. 8 where two single screws are used for retraction of two canines to be effected after extraction of two first premolars E.

Moreover, in order to effect asymmetric reductions, two independent rods 1, threaded only on one side, can be mounted in line within a housing 7, so that each rod with respective slider and wires can be controlled independently of the other.

It will be understood that changes and modifications may be made in the design, construction and arrangement of the parts without departing from the spirit and scope of this invention.

What is claimed is:

1. An orthodontic screw for rational reduction of one or more inter-incisor diastems and for other minor dental abnormalities, having a rotatable rod with right-hand threads on one portion and left-hand threads on the opposite portion thereof, each one of said portions having a small sleeve-like slider threaded thereon, said orthodontic screw comprising a radially projecting pair of suitable steel wires on each one of said sliders welded thereon, a housing closed at both ends, said housing having an internal length equal to the length of said rod, said housing having on one side, preferably along the entire length thereof, a longitudinal slot through which said two pairs of steel wires project radially, said rod and said sliders being received in said housing, the former rotatably, the latter axially slidably, a connecting base of each one of said pairs, said base engaging the two longitudinal edges of said slot, said base acting as a key preventing said sliders from rotating with said rod, said rod having a central cylindrical unthreaded portion with radial holes for inserting a suitable pointed tool for rotating said rod for causing micrometric oppositely-directed movements of said sliders and of said respective steel wires, said wires being suitably shaped and anchored to the teeth to be moved.

2. An orthodontic screw according to claim 1, wherein said rotatable rod, in order to effect simple unilateral orthodontic movements, has a single threaded portion and a single slider with corresponding pressure wires.

3. An orthodontic screw according to claim 1, said tubular housing rotatably receiving said single-threaded rod having at least one projection ensuring the anchoring of said housing to an orthodontic plate.

4. An orthodontic screw according to claim 1, so modified as to be used for asymmetric reductions, wherein said tubular housing rotatably accommodates two independent aligned rods threaded only on one side and carrying the respective sliders and pressure wires.

5. An orthodontic screw according to claim 1, said tubular housing rotatably receiving said double-threaded rod having at least one projection ensuring the anchoring of said housing to an orthodontic plate.

References Cited

UNITED STATES PATENTS 934,958   9/1909   Case _____ 32—14

FOREIGN PATENTS 91,394   8/1922   Austria.

ROBERT PESHOCK, Primary Examiner